United States Patent
Kwon et al.

(10) Patent No.: US 7,489,652 B2
(45) Date of Patent: Feb. 10, 2009

(54) METHOD OF COMMUNICATIONS BETWEEN MIMO STATIONS

(75) Inventors: Chang-yeul Kwon, Seongnam-si (KR); Chil-youl Yang, Yongin-si (KR); Tae-kon Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 536 days.

(21) Appl. No.: 11/032,349

(22) Filed: Jan. 11, 2005

(65) Prior Publication Data

US 2005/0160181 A1    Jul. 21, 2005

(30) Foreign Application Priority Data

Jan. 15, 2004    (KR)    ............... 10-2004-0002969

(51) Int. Cl.
    *H04Q 7/00*    (2006.01)
(52) U.S. Cl. ...................................... 370/328
(58) Field of Classification Search ............ None
    See application file for complete search history.

(56) References Cited

U.S. PATENT DOCUMENTS

| | | | |
|---|---|---|---|
| 6,463,096 B1 * | 10/2002 | Raleigh et al. ............ 375/225 |
| 6,483,884 B1 * | 11/2002 | Shen et al. ............... 375/347 |
| 6,493,545 B1 * | 12/2002 | Sugaya ................... 455/272 |
| 6,721,550 B1 * | 4/2004 | Okada et al. ............ 455/277.1 |
| 6,741,587 B2 * | 5/2004 | Holma et al. ............ 370/362 |
| 6,754,195 B2 * | 6/2004 | Webster et al. .......... 370/335 |
| 6,760,882 B1 * | 7/2004 | Gesbert et al. .......... 714/774 |
| 7,224,704 B2 * | 5/2007 | Lu et al. ................. 370/476 |
| 2002/0022495 A1 * | 2/2002 | Choi et al. .............. 455/522 |
| 2002/0183010 A1 * | 12/2002 | Catreux et al. ........... 455/67.1 |
| 2002/0193146 A1 * | 12/2002 | Wallace et al. .......... 455/562 |
| 2003/0003863 A1 * | 1/2003 | Thielecke et al. ......... 455/39 |
| 2003/0072452 A1 * | 4/2003 | Mody et al. ............. 380/274 |
| 2003/0076787 A1 | 4/2003 | Katz et al. |
| 2003/0169769 A1 * | 9/2003 | Ho et al. ................ 370/473 |
| 2003/0185309 A1 * | 10/2003 | Pautler et al. ........... 375/257 |
| 2004/0258025 A1 * | 12/2004 | Li et al. ................. 370/334 |
| 2004/0266375 A1 * | 12/2004 | Li et al. ................. 455/140 |

(Continued)

FOREIGN PATENT DOCUMENTS

WO    WO 02/25853 A2    3/2002

(Continued)

*Primary Examiner*—Wing F Chan
*Assistant Examiner*—Hicham B Foud
(74) *Attorney, Agent, or Firm*—Sughrue Mion, PLLC

(57) ABSTRACT

A link adaption method for multi input multi output (MIMO) system having a multi-antenna structure and a communicating method of MIMO stations in a basic service set (BSS), which constitutes a wireless communication network. The communicating method includes receiving from a predetermined MIMO station, the number of MIMO antennas and transmission rates supported by the respective MIMO stations. It further includes, storing one or more channel estimations indicators obtained while receiving various framed form the predetermined MIMO station for each MIMO antenna and for each transmission rate supported by the MIMO antenna, determining the threshold levels of the channel estimation for each MIMO antenna, and comparing the threshold levels with an average of channels estimation indicators for each MIMO antenna. The transmission rate is determined based on the comparison result and the data is then transmitted to the predetermined MIMO station ad the determined transmission rate.

9 Claims, 10 Drawing Sheets

| Information element | Element ID |
|---|---|
| SSID | 0 |
| Supported rates | 1 |
| FH Parameter Set | 2 |
| DS Parameter Set | 3 |
| CF Parameter Set | 4 |
| TIM | 5 |
| IBSS Parameter Set | 6 |
| Reserved | 7-15 |
| Challenge text | 16 |
| Reserved for challenge text extension | 17-31 |
| MIMO Capability information | 32 |
| Reserved | 33-255 |

(211 points to "Supported rates"; 212 points to "MIMO Capability information")

U.S. PATENT DOCUMENTS

| | | | |
|---|---|---|---|
| 2005/0135284 A1* | 6/2005 | Nanda et al. | 370/294 |
| 2005/0135295 A1* | 6/2005 | Walton et al. | 370/328 |
| 2005/0135318 A1* | 6/2005 | Walton et al. | 370/338 |
| 2005/0245197 A1* | 11/2005 | Kadous et al. | 455/67.13 |
| 2006/0251193 A1* | 11/2006 | Kopmeiners et al. | 375/345 |
| 2007/0054632 A1* | 3/2007 | Lu et al. | 455/101 |

FOREIGN PATENT DOCUMENTS

| | | |
|---|---|---|
| WO | WO 02/091657 A1 | 11/2002 |
| WO | WO 02/093784 A1 | 11/2002 |

* cited by examiner

FIG. 2A

PHY-TXSTART.request ( TXVECTOR )

where TXVECTOR = { LENGTH, DATARATE, SERVICE, TXPWR LEVEL }

FIG. 2B

PHY-RXSTART.indicate ( RXVECTOR )

where RXVECTOR = { LENGTH, RSSI, DATARATE, SERVICE }

FIG. 5

| Information element | Element ID |
| --- | --- |
| SSID | 0 |
| Supported rates | 1 |
| FH Parameter Set | 2 |
| DS Parameter Set | 3 |
| CF Parameter Set | 4 |
| TIM | 5 |
| IBSS Parameter Set | 6 |
| Reserved | 7–15 |
| Challenge text | 16 |
| Reserved for challenge text extension | 17–31 |
| MIMO Capability information | 32 |
| Reserved | 33–255 |

FIG. 9 history-based channel estimation table(500)

| STATION NUMBER (510) | ANTENNA INDEX (520) | CHANNEL ESTIMATION INDICATORS (530) | TRANSMISSION RATES SUPPORTED (540) | | | | | | | |
|---|---|---|---|---|---|---|---|---|---|---|
| | | | 1 | 2 | 3 | 4 | 5 | 6 | 7 | 8 |
| 1 | 0 | RSSI | ▓ | ▓ | ▓ | ▓ | ▓ | ▓ | | |
| | | PER | ▓ | ▓ | ▓ | | | | | |
| | | retry | ▓ | ▓ | ▓ | ▓ | | | | |
| | 1 | RSSI | | | | | | | | |
| | | PER | | | | | | | | |
| | | retry | | | | | | | | |
| | 2 | RSSI | | | | | | | | |
| | | PER | | | | | | | | |
| | | retry | | | | | | | | |
| ⋮ | | | ⋮ | | | | | | | |
| m-1 | 0 | RSSI | | | | | | | | |
| | | PER | | | | | | | | |
| | | retry | | | | | | | | |
| | 1 | RSSI | | | | | | | | |
| | | PER | | | | | | | | |
| | | retry | | | | | | | | |
| | 2 | RSSI | | | | | | | | |
| | | PER | | | | | | | | |
| | | retry | | | | | | | | |

US 7,489,652 B2

METHOD OF COMMUNICATIONS BETWEEN MIMO STATIONS

CROSS-REFERENCE TO RELATED APPLICATION

This application claims the priority of Korean Patent Application No. 10-2004-0002969 filed on Jan. 15, 2004 in the Korean Intellectual Property Office, the disclosure of which is incorporated herein in its entirety by reference.

BACKGROUND OF THE INVENTION

1. Field of the Invention

The present invention relates to multiple input multiple output (MIMO) technology, and more particularly, to a link adaptation method suitable for a MIMO system having a multi-antenna structure.

2. Description of the Related Art

In accordance with the proliferation and development of digital devices, digital technology has demanded a high-speed wireless local area network (LAN) system that will operate at data rates of 100 Mbits/sec or higher. To meet such demand, multiple input multiple output (MIMO) technology has been introduced as a candidate for one of the most promising technologies for speeding up next generation wireless LAN systems.

The MIMO technology is classified into a spatial multiplexing technique, which enables higher-speed data transmission by simultaneously transmitting different types of data using multiple transmitting and receiving antennas without the necessity of increasing the bandwidth of an entire system, and a spatial diversity technique, which enables transmission diversity by transmitting one kind of data using multiple transmitting antennas.

Specifically, the spatial multiplexing technique is an adaptive array antenna technique which electrically controls directionality using multiple antennas, in which a plurality of independent transmission paths are established by decreasing the directionality in a narrow-beam pattern, thereby increasing the transmission speed according to the number of antennas. In this case, the same frequency and transmission timing are utilized by the respective antennas.

In a conventional single input single output (SISO)-based wireless LAN system (IEEE 802.11 or 802.11a), a link adaptation method, which varies data transmission methods adaptively to the communication network environment between stations, employs a state of a wireless channel as a factor that can be used in data transmission by a current transmitter, thereby achieving efficient data transmission between the stations.

FIG. 1 illustrates the relationship between a media access control (MAC) layer 20 and a physical layer 10 according to the IEEE 802.11 standard. Referring to FIG. 1, the MAC layer 20 performs data communication with higher layers via a MAC service access point (SAP) 30 and with the physical layer 10 via a physical SAP 40. The physical layer 10 comprises two sublayers, including a physical layer convergence procedure (PLCP) sublayer 11 and a physical medium dependent (PMD) sublayer 12. The PLCP sublayer 11 and the PMD sublayer 12 perform data communication via a PMD SAP 50.

The PLCP sublayer 11 is a layer defined to allow the MAC layer 20 to be minimally associated with the PMD sublayer 12. In other words, the PLCP sublayer 11 converts a service occurring in the MAC layer 20 into a service compatible with an orthogonal frequency division multiplexing (OFDM) physical layer or converts a signal obtained from the OFDM physical layer into a signal compatible with the service occurring in the MAC layer 20 so that the MAC layer 20 can operate independently of the OFDM physical layer.

The PMD sublayer 12 provides the OFDM physical layer with a predetermined signal transmission/reception method. In other words, the PMD sublayer 12, which is closely related to the OFDM physical layer, converts the service occurring in the MAC layer 20 into a service compatible with the OFDM physical layer.

The physical layer 10 of a receiving station, specifically the PLCP sublayer 11, transmits RXVECTOR 60 to the MAC layer 20 via the physical SAP 40. Here, RXVECTOR 60 includes many parameters, including a received signal strength indicator (RSSI). The MAC layer 20 of a transmitting station transmits TXVECTOR 70 to the PLCP sublayer 11 via the physical SAP 40. Here, TXVECTOR 70 includes parameters, such as data transmission rate, power and the like.

FIG. 2A illustrates a function, to which TXVECTOR 70 is applied, and parameters of the function are also shown in FIG. 2A. FIG. 2B illustrates a function, to which RXVECTOR 60 is applied. FIG. 2B also displays parameters of the function. Referring to FIGS. 2A and 2B, TXVECTOR 70 is used as a factor of a function PHY-TXSTART.request, and RXVECTOR 60 is used as a factor of a function PHY-RXSTART.indicate.

More specifically, as shown in FIG. 2A, the TXVECTOR 70 includes parameters LENGTH, DATARATE, SERVICE, and TXPWR LEVEL. The parameter LENGTH indicates the number of data octets to be transmitted from a MAC layer of a transmitting station to a receiving station via a physical layer of the transmitting station and has a value between 1 and 4095. The parameter DATARATE indicates a transmission rate of signals transmitted over a wireless LAN, which can be selected among transmission rates supported by the IEEE 802.11a standard, i.e., 6, 9, 12, 18, 24, 36, 48, and 54 Mbps. Among the transmission rates, 6, 12, and 24 Mbps are essentially supported. The parameter SERVICE includes 7 null bits reserved for initialization of a scrambler and 9 null bits reserved for later use. The parameter TXPWR_LEVEL is used for determining the power of signals to be transmitted and has a value between 1 and 8.

As shown in FIG. 2B, the RXVECTOR 60 includes parameters LENGTH, RSSI, DATARATE, and SERVICE. The parameter LENGTH indicates a value of a length field of a received PLCP header and has a value between 1 and 4095, similar to LENGTH of the TXVECTOR 70. The parameter RSSI indicates the energy or intensity of a signal detected from an antenna of a receiving station that is currently receiving data from a transmitting station and is determined when receiving a PLCP preamble. The parameter DATARATE indicates a transmission rate of the data currently being received by the receiving station. Similar to DATARATE of the TXVECTOR 70, DATARATE of the RXVECTOR 60, may be set to one of 6, 9, 12, 18, 24, 36, 48, and 54 Mbps. The parameter SERVICE of the RXVECTOR 60 includes null bits, analogous to SERVICE of the TXVECTOR 70.

In such a wireless LAN environment, a transmitting station transmits data to a receiving station at a transmission rate. Alternatively, a transmitting station transmits data to a receiving station based on the power of the signal selected by a transmission rate switching mechanism. In this case, the transmitting station performs rate switching through various indicators of states of channels, such as the transmission success proportion of previous frames.

There is another conventional link adaptation method that increases, decreases, or maintains a transmission rate based on a result obtained by comparing an RSSI value measured at an antenna of a conventional SISO system with a predetermined threshold value.

There is a still another conventional link adaptation method that checks packet error rate (PER), which is another parameter used in a link adaptation process, i.e., that checks the transmission success proportion of an acknowledgement (ACK) frame transmitted from a receiving station in response to the transmission of data to the receiving station.

The conventional link adaptation methods described above are inappropriate for MIMO systems using a multi-antenna structure even though they are still effective for SISO systems using a single antenna structure. Therefore, there exists a need for development of a link adaptation method for MIMO systems.

SUMMARY OF THE INVENTION

The present invention provides an improved wireless LAN system for a MIMO system having multiple antennas, in which the most efficient transmission rate is selected for data transmission according to states of communication network channels and the number of receiver antennas.

In accordance with an aspect of the present invention, there is provided a communicating method of MIMO stations in a basic service set (BSS), which constitutes a wireless communication network, the communicating method comprising, receiving the number of MIMO antennas and transmission rates supported by the respective MIMO antennas from a predetermined MIMO station, storing one or more channel estimation indicators obtained while receiving various frames from the predetermined MIMO station for the respective MIMO antennas and for the respective transmission rates supported by the MIMO antennas, determining threshold levels of the channel estimation indicators for the respective MIMO antennas, comparing the threshold levels of the channel estimation indicators for the respective MIMO antennas with averages of the channel estimation indicators for the respective MIMO antennas, and determining a transmission rate based on comparison results to then transmit data to the predetermined MIMO station at the determined transmission rate.

The method of determining a transmission rate may comprise, determining, the highest transmission rate for each MIMO antenna for which the average of the channel estimation indicators stored for each MIMO antenna respectively exceeds the threshold level of the channel estimation indicators, summing up the highest transmission rate determined for the respective MIMO antennas, and selecting a lower transmission rate among the entire transmission rates obtained as the summing result and the entire transmission rates determined for the predetermined MIMO stations, and transmitting data to the predetermined MIMO station at the selected transmission rate.

The channel estimation table may include a received signal strength indicator (RSSI) defined by the IEEE 802.11 standard.

Also, the channel estimation table may include an average packet error rate (PER) as one of the channel estimation indicators.

The channel estimation table may further include an average number of retries of data transmission until an acknowledgement (ACK) frame is received as one of the channel estimation indicators.

The RSSI value measured for each antenna is preferably converted into vectors to be transmitted to a MAC layer and is stored in the channel estimation table.

In the present invention, MIMO communications can be realized by using conventional spatial multiplexing MIMO chipsets, a detailed description of which, however, will not be presented here. For example, MIMO communications can be realized using an AGN 100 Wi-Fi chip set manufactured by Airgo Networks. The AGN 100 Wi-Fi chip set, which has a much higher transmission rate of 108 Mbps per channel, compared with a conventional Wi-Fi chip set, is perfectly compliant with all of the Wi-Fi standards and supports the IEEE 802.11a, 802.11b, and 802.11g standards.

BRIEF DESCRIPTION OF THE DRAWINGS

The above and other features and advantages of the present invention will become more apparent by describing in detail exemplary embodiments thereof with reference to the attached drawings in which:

FIG. 2A is a diagram illustrating a function, to which TXVECTOR is applied, displaying parameters of the function;

FIG. 2B is a diagram illustrating a function, to which RXVECTOR is applied, displaying parameters of the function;

FIG. 5 is a table showing different types of element IDs recorded in an ID field of FIG. 4;

FIG. 9 is a diagram illustrating a history-based channel estimation table according to the present invention.

DETAILED DESCRIPTION OF THE INVENTION

Figure 1:
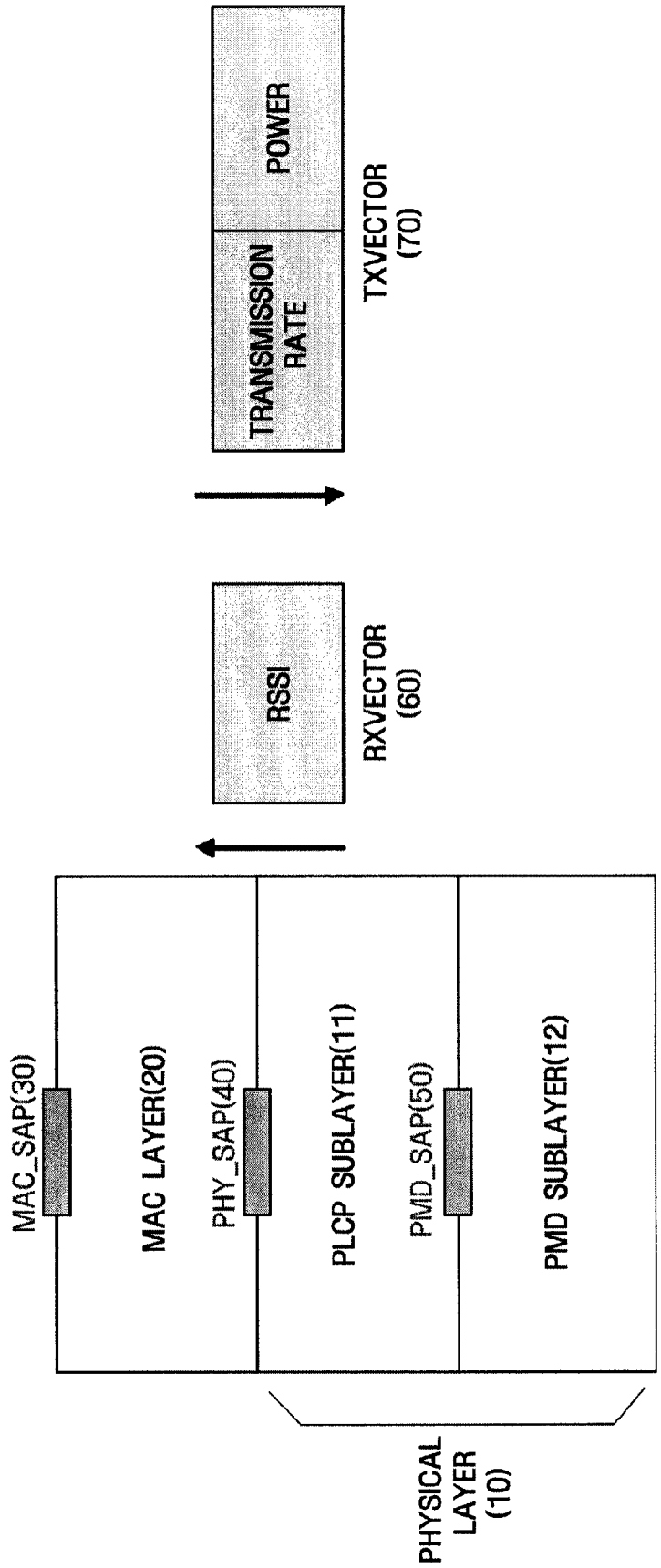
FIG. 1 is a diagram illustrating the relationship between a media access control (MAC) layer and a physical layer according to the IEEE 802.11 standard.

The present invention will now be described more fully with reference to the accompanying drawings, in which preferred embodiments of the invention are shown. This invention may, however, be embodied in many different forms and should not be construed as being limited to the embodiments set forth herein. Rather, these embodiments are provided so that this disclosure will be thorough and complete, and will fully convey the concept of the invention to those skilled in the art. In the drawings, the same reference numerals represent the same elements.

Figure 3:
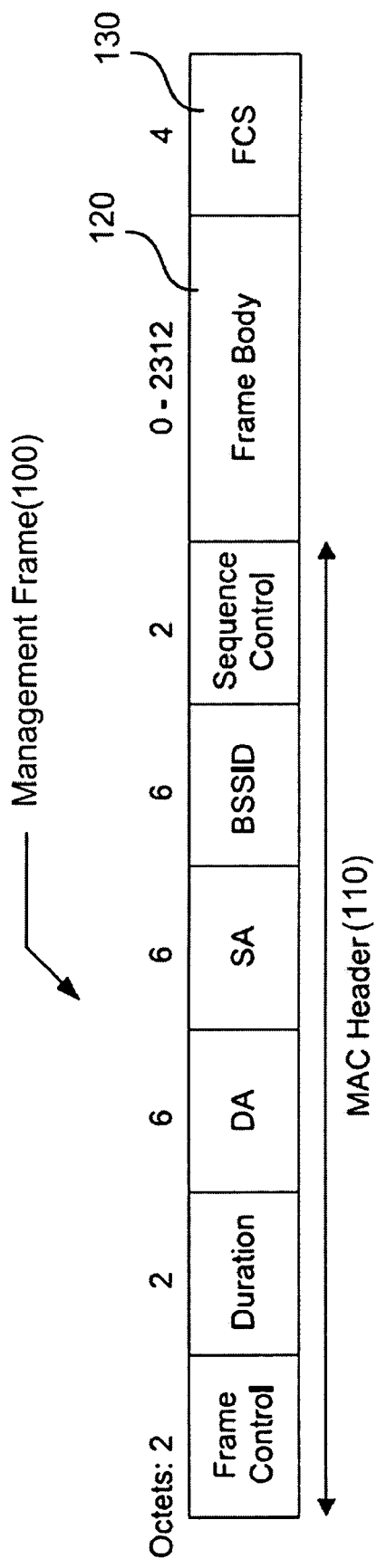
FIG. 3 is a diagram illustrating the format of an IEEE 802.11 management frame.

FIG. 3 is a diagram illustrating the format of an IEEE 802.11 management frame 100. The management frame 100 may be a beacon frame, an association request frame, a dissociation frame, an association response frame, a probe request frame, or a probe response frame.

The management frame 100 includes a media access control (MAC) header 110, a frame body 120, and a frame check sequence (FCS) field 130. The MAC header 110 includes a frame control field, a duration field, a destination address (DA) field, a source address (SA) field, a basic service set identification (BSSID) field, and a sequence control field.

Figure 4:
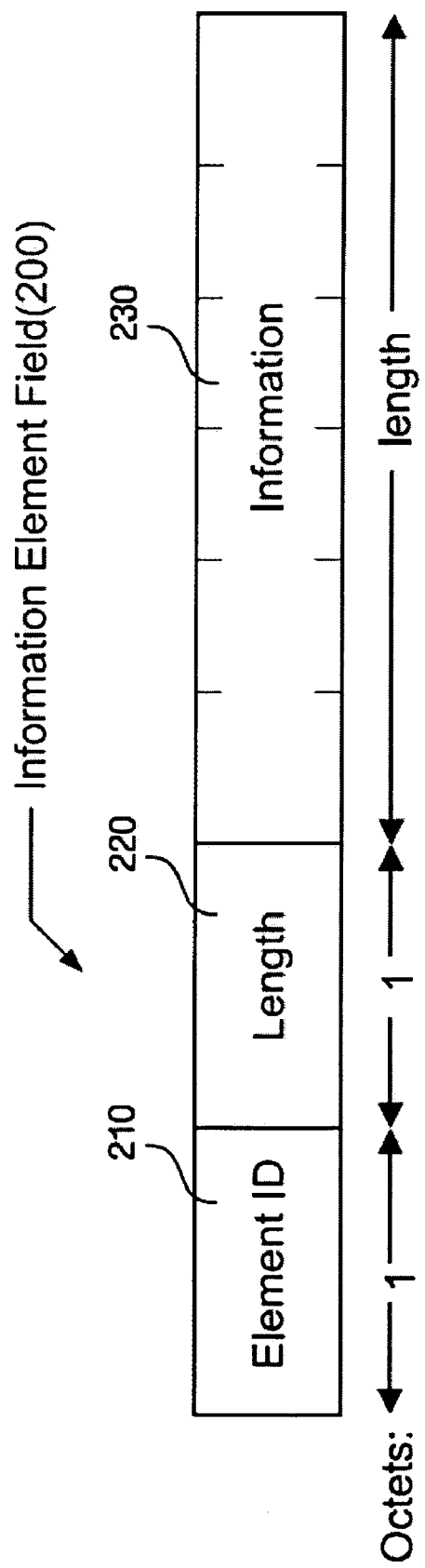
FIG. 4 is a diagram illustrating the format of an information element field of a frame body of the IEEE 802.11 management frame.

The frame body 120 of the management frame 100 is filled with one or more information elements (IEs) 200, as shown in FIG. 4. Each of the IEs 200 includes an element ID field 210 in which the type of IE 200 is recorded, an information field 230 in which data to be actually transmitted through the IE 200 is recorded, and a length field 220 in which the size of the information field 230 is recorded.

FIG. 5 is a tabulated diagram illustrating information elements and their respective element IDs recorded in their respective element ID fields. The respective element ID determines the type of information element. In the prior art, information elements having element IDs of 32-255 are reserved. In the present invention, the information element having an element ID of 32, called a MIMO capability information 212, is further added to the conventional information elements.

In the conventional SISO technology, the transmission rate is determined by an information element having an element ID of 1, which is a supported rate information element 211.

The link adaptation method for a wireless communication network which uses at least one antenna configured to transmit and receive, comprises generating information on a management frame. The information on the management frame comprises single input single output (SISO) information that indicates at least one transmission rate of a first plurality of transmission rates supported by a single SISO antenna configured to transmit and receive, and multi input multi output (MIMO) information that indicates at least one transmission rate of a second plurality of transmission rates supported by a plurality of MIMO antennas configured to transmit and receive. The information on the management frame is transmitted using either the single SISO antenna or at least one of the plurality of MIMO antennas.

Figure 6:
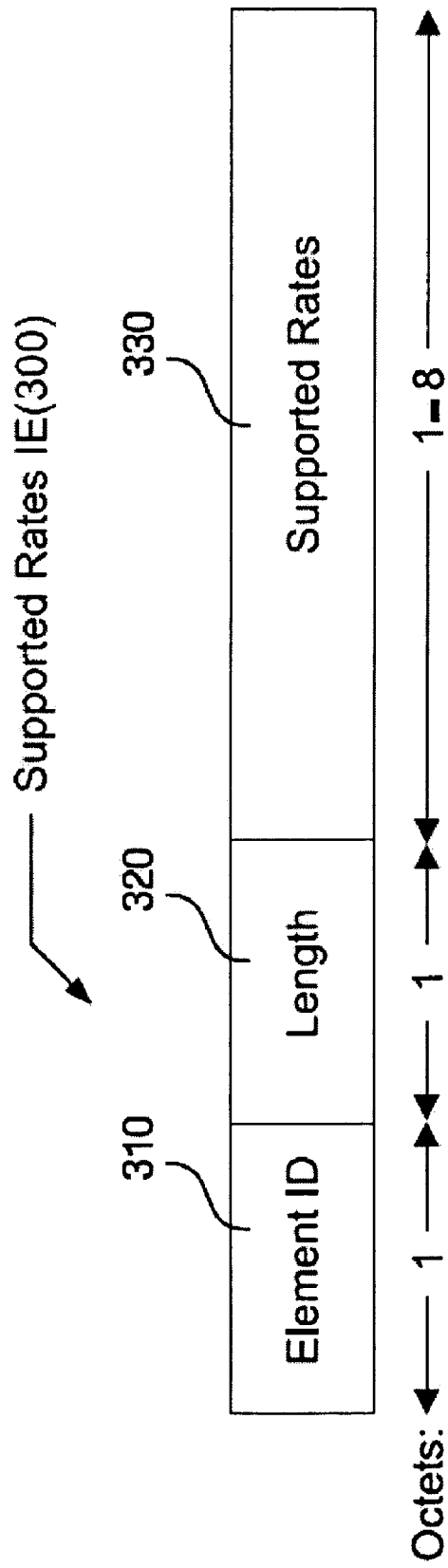
FIG. 6 is a diagram illustrating the format of a supported rates information element.

FIG. 6 illustrates the format of a supported rates information element 300 according to a preferred embodiment of the present invention. The supported rates information element 300 includes a 1-byte element ID field 310, a 1-byte length field 320, and a 1 to 8 byte supported rates field 330. At least one of the eight transmission rates supported by the IEEE 802.11 standard, that is, 6, 9, 12, 18, 24, 36, 48, and 54 Mbps correspond to one of the bytes recorded in the supported rates information element 300.

Figure 7:
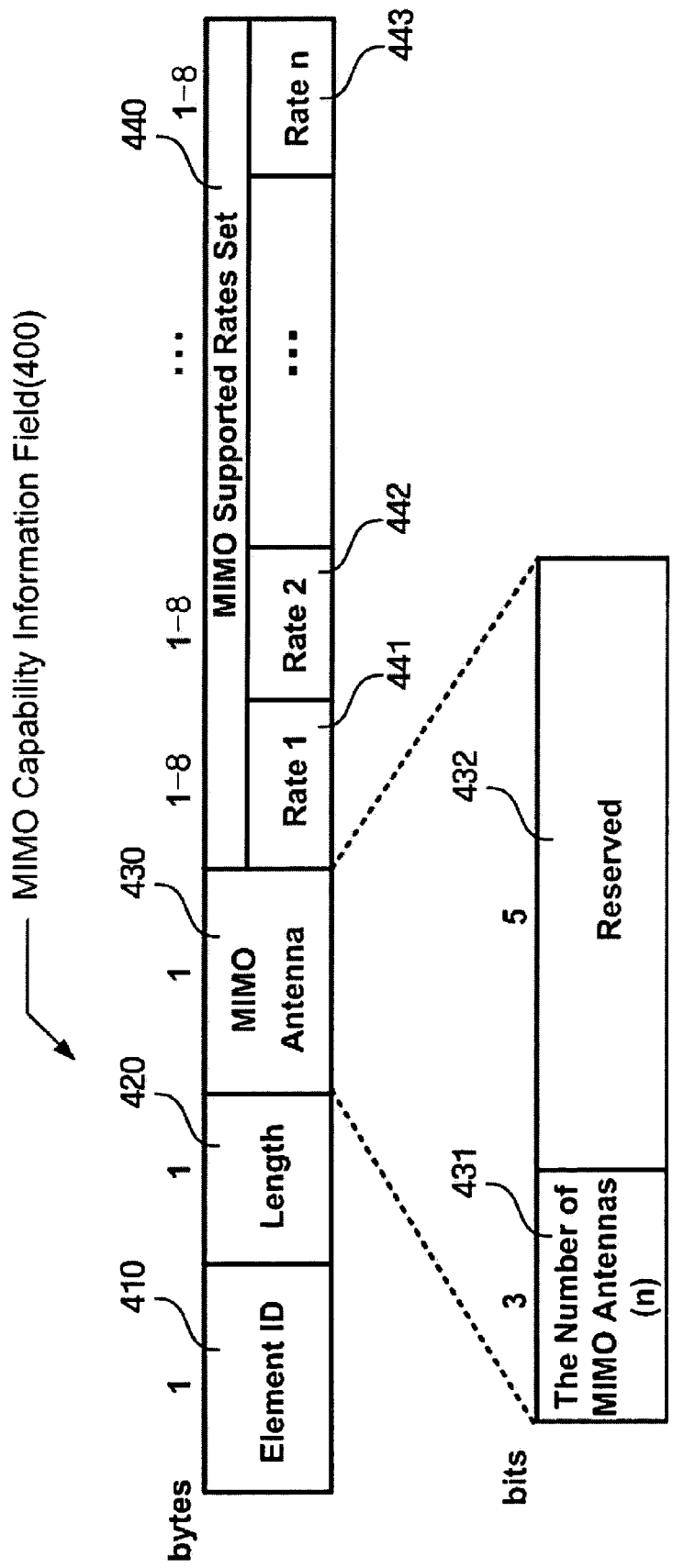
FIG. 7 is a diagram illustrating the format of a MIMO capability information field.

FIG. 7 illustrates the format of a MIMO capability information element 400 according to a preferred embodiment of the present invention, which is an improvement of the supported rates information element 300 shown in FIG. 6. The MIMO capability information element 400 includes a 1-byte element ID field 410, a 1-byte length field 420, a 1-byte MIMO antenna field 430, and a MIMO supported rates set field 440, which has as many bits as a total number of transmission rates supported by each MIMO antenna.

The element ID of the MIMO capability information element 400, that is, 32, is recorded in the element ID field 410, and the sum of sizes of the MIMO antenna field 430 and the MIMO supported rates set field 440 is recorded in the length field 420. Supposing that there are n MIMO antennas, the size of the MIMO supported rates set field 440 can be obtained by the following equation:

$$N = \overset{n}{\underset{i=1}{Q}}[\text{number of transmission rates supported by } i\text{-th MIMO antenna}].$$

Therefore, a value of N+1 is recorded in the length field 420.

The MIMO antenna field 430 includes subfields, such as 'The number of MIMO antennas' field 431 comprising 3 bits in which the number n of MIMO antennas is recorded, and a 5-bit Reserved field 432.

As described above, the MIMO supported rates set field 440 has a size of N bytes, and N is determined depending on the number n of MIMO antennas and the number of transmission rates supported by each MIMO antenna. Data rates supported by each MIMO antenna are recorded in the 1-byte subfields 441 through 443. In other words, at least one of the eight transmission rates supported by the IEEE 802.11 standard, i.e., 6, 9, 12, 18, 24, 36, 48, and 54 Mbps, may be recorded in each of the subfields 441 through 443.

Figure 8:
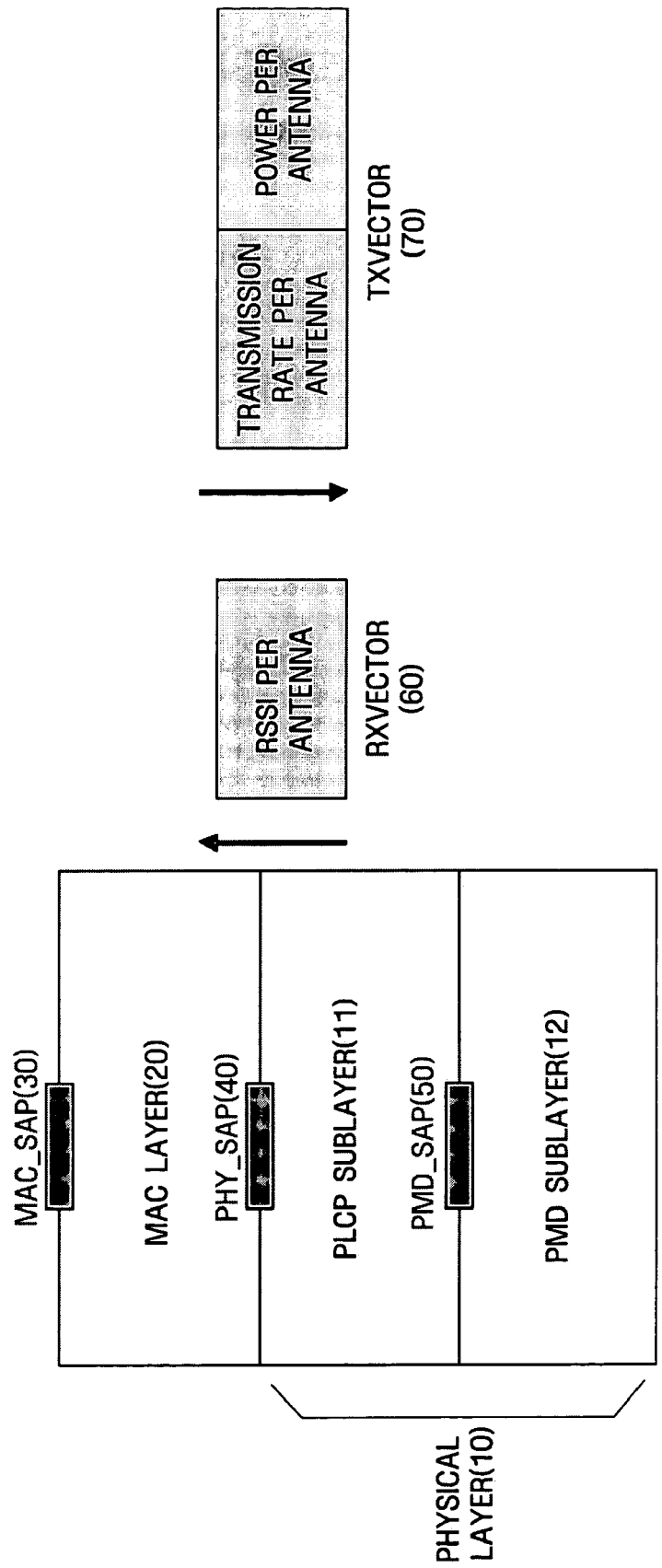
FIG. 8 is a diagram illustrating the relationship between a MAC layer and a physical layer according to the present invention.

FIG. 8 illustrates the relationship between an MAC layer 20 and a physical layer 10 in a MIMO system to which the present invention is applied. The MAC layer 20 and the physical layer 10 are the same as their respective counterparts illustrated in FIG. 1 in terms of their structures and the way they transmit/receive data to/from their respective upper and lower layers. However, the MAC layer 20 and the physical layer 10 shown in FIG. 8 are different in that RSSI as a parameter of the RXVECTOR 60 shown in FIG. 1 is replaced by 'RSSI of each antenna' (or RSSI Per Antenna) of the RXVECTOR 60 shown in FIG. 8, and 'transmission rate' and 'power' as parameters of the TXVECTOR 70 shown in FIG. 1 are replaced by 'transmission rate of each antenna' (or Transmission Rate Per Antenna) and 'power of each antenna' (or Power Per Antenna) shown in FIG. 8.

For example, if there are n MIMO antennas, a number of parameters RSSI_1, RSSI_2, . . . , RSSI_n may be provided, or n pieces of RSSI information may be recorded in a single parameter RSSI.

FIG. 9 illustrates a history-based channel estimation table 500 according to the present invention. FIG. 9 shows m stations existing in a basic service set (BSS), each of the m stations manages channel estimation indicators for the rest of the m stations using the history-based channel estimation table 500.

Referring to FIG. 9, the history-based channel estimation table 500 records channel estimation indicators 530 together with a serial number 510 of each station and an antenna index 520 of each antenna of each station. In the present embodiment, the channel estimation indicators 530 are an average RSSI, an average packet error rate (PER), and an average number of retries of data transmission until an acknowledgement (ACK) frame is received. However, exemplary embodiments of the present invention may contain additional channel estimation indicators 530.

The average RSSI is determined by measuring RSSI values of a unicast frame, a broadcast frame, a multicast frame, and an ACK frame, received by a station in a MIMO system, at each MIMO antenna. The average PER and the average number of retries of data transmission until an ACK frame is received are determined in almost the same manner as the average RSSI. The channel estimation indicators 530 are updated whenever new data is transmitted.

A user may set a threshold value for each of the channel estimation indicators 530, based on experience or by trial and error, with reference to, for example, the average of each of the channel estimation indicators 530. For example, as shown in FIG. 9, when an antenna index of a station 1 is 0, transmission rates at which an average RSSI exceeds a RSSI threshold, a transmission rate at which an average PER exceeds a PER threshold, and transmission rates at which an average number of retries of data transmission until an ACK frame is received exceeds a threshold value of retries of data transmission until an ACK frame is received are marked by hatched lines.

A critical transmission rate at which the average RSSI exceeds the RSSI threshold, a critical transmission rate at which the average PER exceeds the PER threshold, and a critical transmission rate at which the average number of retries of data transmission until an ACK frame is received exceeds the threshold value of retries of data transmission until an ACK frame is received are transmission rates 6, 3, and 4, respectively. Therefore, a critical transmission rate at which the averages of the channel estimation indicators 530 exceed the threshold of the channel estimation indicators 530 is the transmission rate 3. Then, a current transmission rate is switched to the transmission rate 3, thereby actually transmitting/receiving data to/from stations at the transmission rate 3.

While it has been described that threshold values are independently set for the respective channel estimation indicators 530, an overall threshold value may be set for all of the channel estimation indicators 530. In other words, the user may determine transmission rate depending on whether a value obtained by adding a predetermined weight on the averages of the channel estimation indicators 530 and summing up the resultant averages exceeds a threshold obtained by adding the predetermined weight on the thresholds of the channel estimation indicators 530 and summing up the resultant thresholds.

Figure 10:
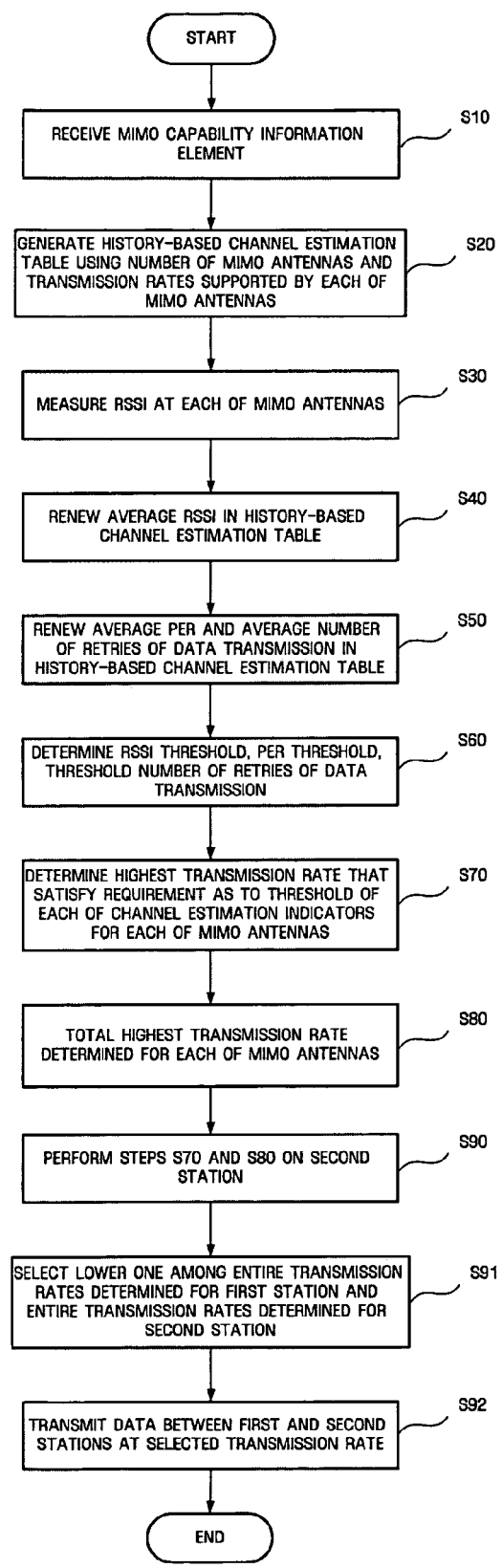
FIG. 10 is a flowchart of the overall operation of a communicating method of MIMO stations according to the present invention.

FIG. 10 is a flowchart illustrating the overall operation of the present invention.

First, referring to FIG. 10, a first station receives a MIMO capability information element of a management frame transmitted from another station in its BSS in step S10. In step S20, the first station generates a history-based channel estimation table using information obtained from the MIMO capability information element, such as the number of MIMO antennas and transmission rates supported by each MIMO antenna.

While the first station transmits/receives various frames to/from another station, an RSSI value is measured for each MIMO antenna in step S30. As illustrated in FIG. 8, the first station transmits the RSSI value from a PLCP sublayer to an MAC layer.

In step S40, an average RSSI value in the history-based channel estimation table is renewed in the MAC layer for each MIMO antenna of each station by using the RSSI value transmitted from the PLCP sublayer. In step S50, an average PER and an average number of retries of data transmission until an ACK frame is received in the history-based channel estimation table is renewed based on a PER and the number of retries of data transmission until an ACK frame is received, which are measured for each MIMO antenna during transmission of various frames.

In step S60, an RSSI threshold, a PER threshold, and a retry threshold are determined based on a comprehensive evaluation of the RSSI, PER and retry channel estimation indicators 530. The thresholds are determined, for example, based on experience, by trial and error, or in consideration of the purpose for using the stations.

When the first station attempts to transmit data, a highest transmission rate, at which the average RSSI, the average PER, and the average number of retries of data transmission until an ACK frame is received respectively exceed the RSSI threshold, the PER threshold, and the threshold number of retries of data transmission until an ACK frame is received, is set for each MIMO antenna in step S70. In step S80, transmission rates, at which the first station can transmit data to the second station, are determined by summing up the highest transmission rate set for each MIMO antenna.

In step S90, steps S10 through S80 are performed for a second station, which is to receive data from the first station, so that a highest transmission rate, at which an average RSSI, an average PER, and an average number of retries of data transmission until an ACK frame is received respectively exceed an RSSI threshold, a PER threshold, and a threshold number of retries of data transmission until an ACK frame is received, can be set for each MIMO antenna and so that transmission rates, at which the second station can receive data from the first station, can be determined by summing up the highest transmission rate set for each MIMO antenna.

In step S91, the lowest transmission rate among the total transmission rates corresponding to the first station and the total transmission rates corresponding to the second station is selected as a final transmission rate. In step S92, the first station transmits data to the second station at the final transmission rate determined in step S91.

Although the present invention has been fully described in connection with the preferred embodiments thereof with reference to the accompanying drawings, it is to be noted that various changes and modifications are apparent to those skilled in the art. Such changes and modifications are to be understood and included within the scope of the present invention as defined by the appended claims unless they depart therefrom. Therefore, the described embodiments are to be considered in all respects only as illustrative and not restrictive of the scope of the invention.

According to the present invention, it is possible to dynamically change transmission rates according to communication environments of various antennas in a MIMO system. In addition, it is possible to make the MIMO system compliant with a conventional wireless LAN environment by defining the format of frames to be suitable for the MIMO system according to the IEEE 802.11 standard.

What is claimed is:

1. A link adaptation method for a wireless communication network using at least one antenna configured to transmit and receive, the link adaptation method comprising:

generating information on a management frame, the information on the management frame comprises single input single output (SISO) information that indicates at least one transmission rate of a first plurality of transmission rates supported by a single SISO antenna configured to transmit and receive, and multi input multi output (MIMO) information that indicates at least one transmission rate of a second plurality of transmission rates supported by a plurality of MIMO antennas configured to transmit and receive; and transmitting the information on the management frame using either the single SISO antenna or at least one of the plurality of MIMO antennas.

2. The link adaptation method of claim 1, wherein the management frame comprises at least one of a beacon frame, an association request frame, a dissociation frame, an association response frame, a probe request frame, and a probe response frame.

3. The link adaptation method of claim 1, wherein the MIMO information comprises a number corresponding to a number of MIMO antennas and includes data corresponding to the at least one transmission rate of the second plurality of transmission rates supported by at least one of the plurality of MIMO antennas.

4. A link adaptation method for a wireless communication network using at least one antenna configured to transmit and receive, the link adaptation method comprising:

receiving information on a management frame, the information on the management frame comprises single input single output (SISO) information that indicates at least one transmission rate of a first plurality of transmission rates supported by a single SISO antenna configured to transmit and receive, and multi input multi output (MIMO) information that indicates at least one transmission rate of a second plurality of transmission rates supported by a plurality of MIMO antennas configured to transmit and receive; and generating a channel estimation table using the information on the management frame.

5. The link adaptation method of claim 4, wherein the management frame comprises at least one of a beacon frame, an association request frame, a dissociation frame, an association response frame, a probe request frame, and a probe response frame.

6. The link adaptation method of claim 4, wherein the MIMO information comprises a number corresponding to a number of MIMO antennas and includes data corresponding to the at least one transmission rate of the second plurality of transmission rates supported by at least one of the plurality of MIMO antennas.

7. The link adaptation method of claim 4, wherein the channel estimation table includes a received signal strength indicator (RSSI).

8. The link adaptation method of claim 4, wherein the channel estimation table includes at least an average packet error rate (PER).

9. The link adaptation method of claim 4, wherein the channel estimation table includes at least an average number of retries of data transmission until an acknowledgement (ACK) frame is received.

* * * * *